Sept. 4, 1928. 1,683,275
A. A. J. WESTMAN
ROTARY VALVE FOR INTERNAL COMBUSTION ENGINES
Filed April 14, 1925   3 Sheets-Sheet 3
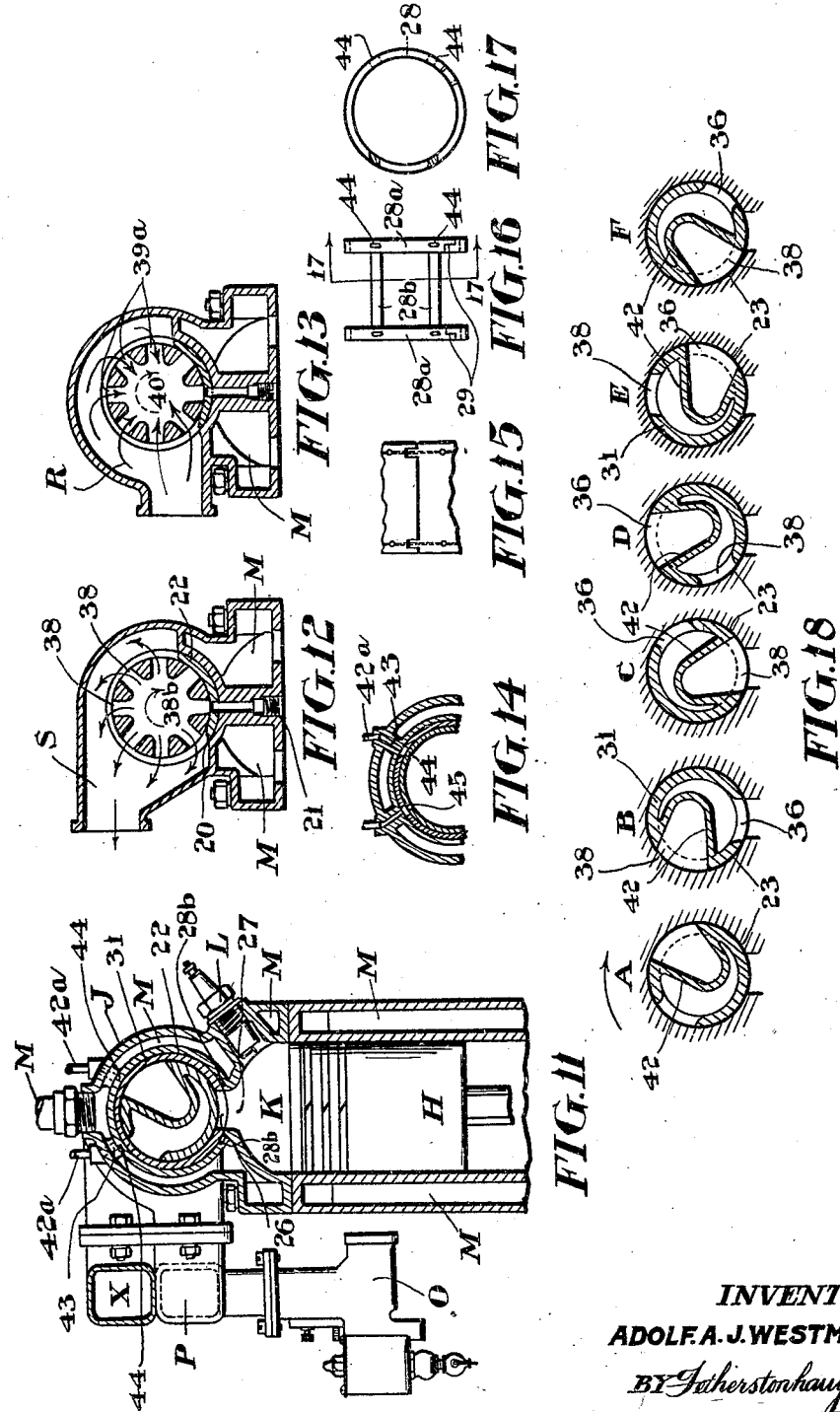
INVENTOR
ADOLF.A.J.WESTMAN
BY Featherstonhaugh & Co
ATTORNEYS Patented Sept. 4, 1928.

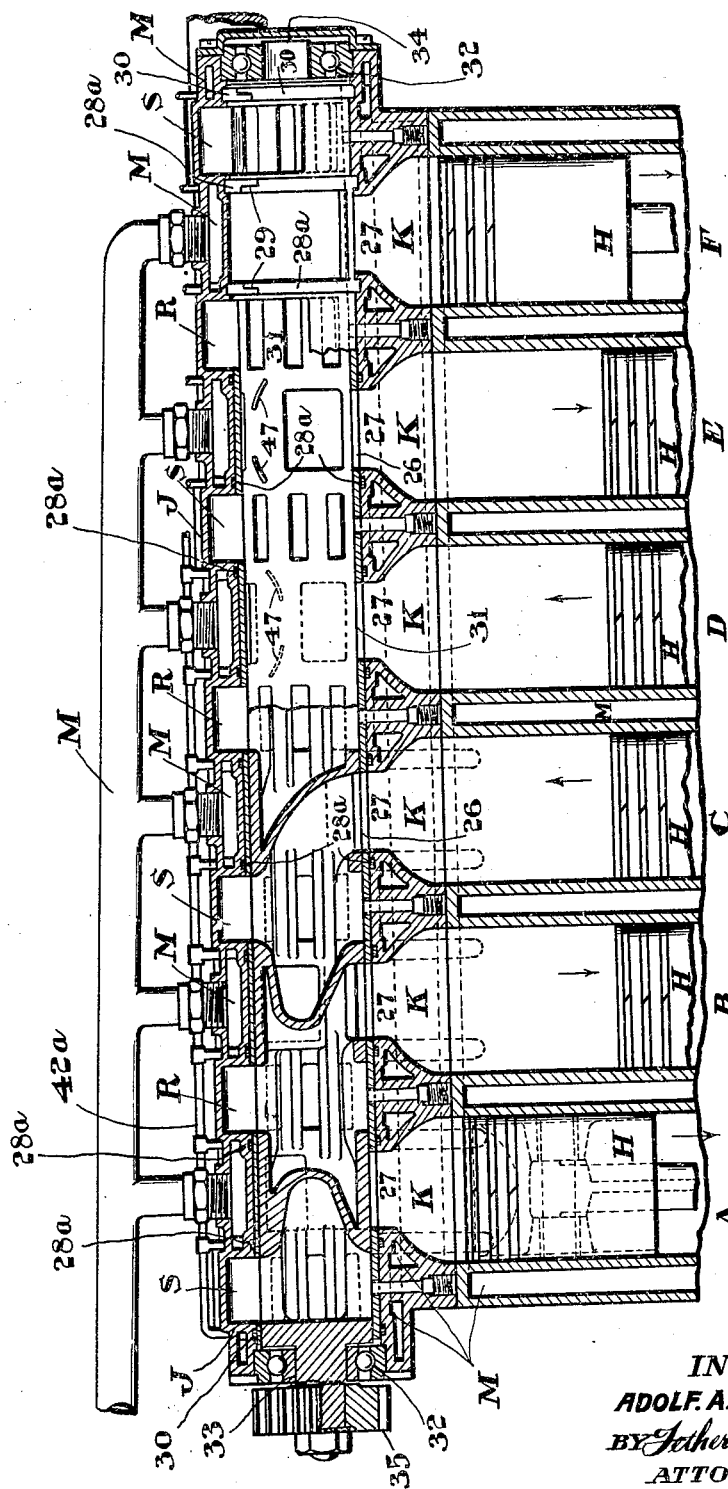

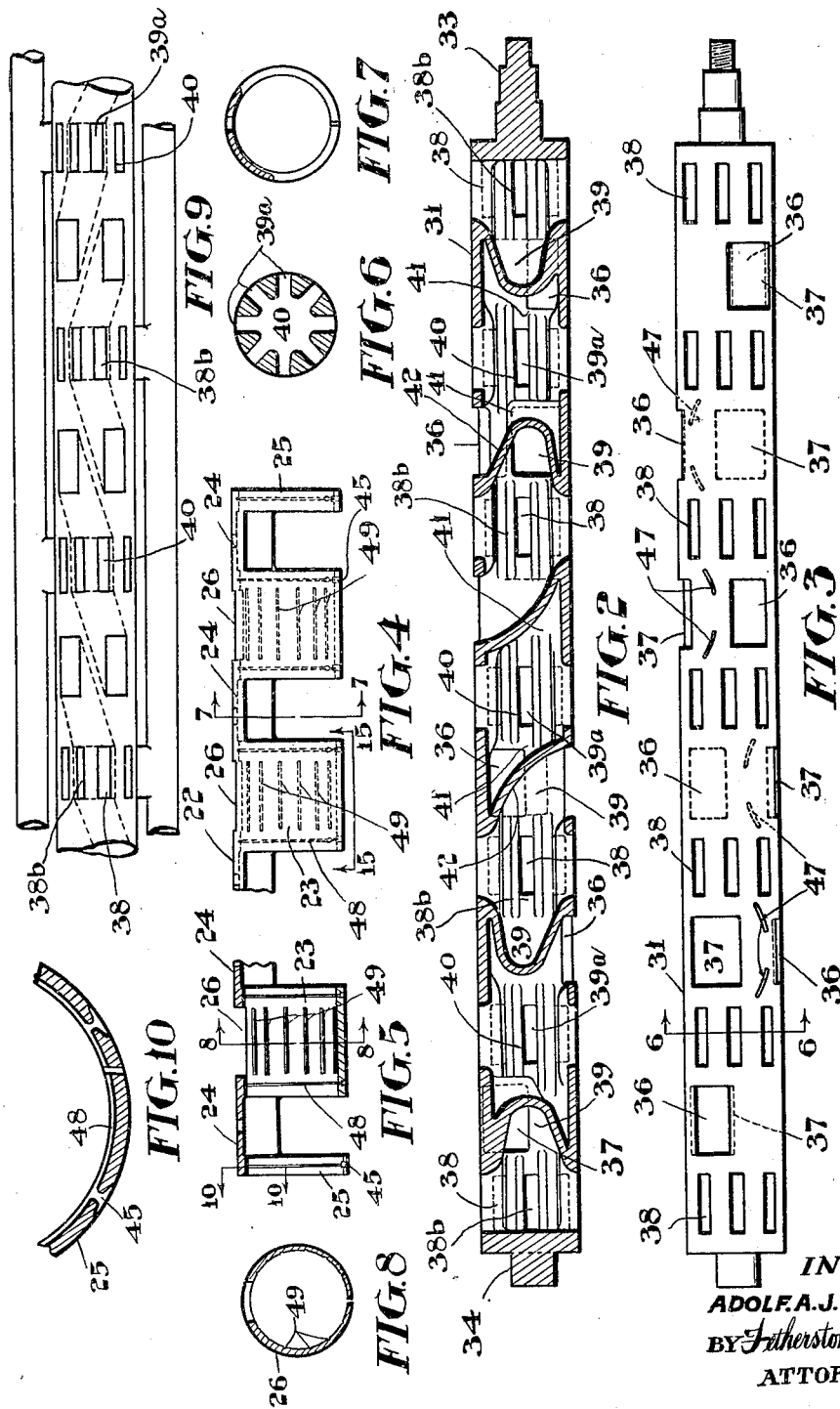

1,683,275

UNITED STATES PATENT OFFICE.

ADOLF A. J. WESTMAN, OF MONTREAL, QUEBEC, CANADA.

ROTARY VALVE FOR INTERNAL-COMBUSTION ENGINES.

Application filed April 14, 1925. Serial No. 23,072.

This invention relates to new and useful improvements in internal combustion engines, and particularly to the valve mechanism thereof, and the object of the invention is to provide an improved rotary valve of simple construction which will be highly efficient in operation.

Another object is to provide a valve of the class stated in which the tendency to bind or seize will be entirely eliminated by allowing free expansion of the valve in every direction, thereby eliminating excessive friction losses which will decrease the efficiency of the engine.

A further object is to provide a valve of the class stated which will assist in thoroughly atomizing the gas mixture before delivering same to the cylinders.

A still further object is to provide a valve of the class stated which will assist in exhausting the burnt gases from the engine.

A still further object is to provide a rotary valve which will preheat the gaseous mixtures before entering the cylinders to increase the efficiency of the engine.

In my invention, the rotary valve is mounted on a fixed sleeve in the cylinder head of the engine and sealing rings are provided on each side of the entrances to the explosion chambers of the various cylinders. Oil under pressure is fed into the valve sleeve, the valve supporting parts of which are provided with a system of grooving to thoroughly lubricate the valve. The valve sleeve has means formed therein to allow for expansion or contraction due to rapid changes in temperature. The gaseous mixture is drawn through a plurality of apertures formed in the valve wall into a chamber positioned between the suction outlets to the explosion chamber at the head of the cylinders, and means are formed in the valve for each chamber to supply the gaseous mixture through the suction outlets to the explosion chamber of two cylinders. Similarly, the exhaust from the cylinders is fed into an exhaust chamber formed in the valve, said exhaust chamber being provided with a plurality of exhaust openings which communicate with the exhaust manifold. Each exhaust of two cylinders positioned one on each side of the chamber. The plurality of apertures from the chambers forms a fan-like structure, which assists in thoroughly mixing and atomizing the mixture of combustible gas before it enters the explosion chamber in the case of feeding gas to the cylinders, and in the case of the exhaust chamber, said fan-like structure assists in rapidly disposing of the burnt gases.

In the drawings:—

Fig. 1 is a longitudinal section of an engine showing my improved valve construction.

Fig. 2 is a sectional elevation of the rotary valve.

Fig. 3 is a side elevation of the rotary valve.

Fig. 4 is a partial side elevation of the valve sleeve.

Fig. 5 is a partial sectional side elevation of the valve sleeve.

Fig. 6 is a sectional end view of the valve taken on the line 6—6, Figure 3.

Fig. 7 is a sectional end view of the sleeve taken on the line 7—7, Figure 4.

Fig. 8 is a sectional end elevation of the valve taken on the line 8—8, Figure 5.

Fig. 9 is a diagrammatic illustration showing the passage of the gas and the exhaust to and from the cylinders.

Fig. 10 is a sectional end elevation of the sleeve taken on the line 10—10, Figure 5.

Fig. 11 is a sectional end view taken through the upper part of one of the cylinders.

Fig. 12 is a section taken through the cylinder valve head showing gases escaping through the exhaust openings in the valve.

Fig. 13 is a sectional end view taken through the cylinder, valve and cylinder head showing the gases entering through the inlet openings in the valve.

Fig. 14 is a partial section showing the valve lubricating system.

Fig. 15 is a partial plan view taken on the line 15—15, Figure 4.

Fig. 16 is a side elevation of one of the sealing rings.

Fig. 17 is a sectional end elevation of the sealing rings taken on the line 17—17, Figure 16.

Fig. 18 shows in diagrammatic form the positions of the valve openings at one particular instant in the rotation of the valve.

Referring more particularly to the drawings, in which I have shown a six cylinder internal combustion engine for illustrative purposes only, A, B, C, D, E and F designate the cylinders having the usual piston and piston rods H slidably mounted therein. The cylinders are attached to a cylinder head J having, in the case illustrated, six explosion chambers K, each adapted to register with one of the cylinders. Each explosion chamber may be provided with a spark plug L in the usual manner and controlled from a part of the engine (not shown). The cylinder head and cylinders are provided with a water circulating means M for cooling the engine while it is running. The mixture of gases passes through the carburetter O into the intake manifold P, which is connected to the engine cylinder head at the points R between the cylinders A and B, C and D, and E and F. The exhaust manifold pipe X is connected to the engine cylinder head at the points S, two of which are positioned between the cylinders B and C and the cylinders D and E. The remaining points S are positioned at each end of the cylinder head. In Figure 13, the inlet chambers R are shown in cross section and, in Figure 12 the exhaust chambers S are shown. Held in position in the horizontally disposed aperture 20 by means of the screwed dowel pins 21, is the valve sleeve 22. The valve sleeve may be cast in one piece or in sections, and comprises six cylindrical portions 23 connected together by means of ribs 24. The two end ribs are connected to the end rings 25. The cylindrical portions, when in the erected or assembled condition, are positioned above the port openings to the cylinders and apertures 26 are formed in each cylindrical portion to coincide with the port openings 27. The sleeve is loosely mounted in the aperture 20 and sealing rings 28 are provided to prevent gases from passing along the outer wall of the sleeve. A detail of the sealing rings for the port openings is shown in Figures 16 and 17 and consists of two rings $28^a$ joined together by means of connecting ribs $28^b$ adapted to pass one on each side of the port opening to the cylinder, as shown in Figure 11, and positioned in the longitudinal direction of the sleeve. The rings $28^a$ encircle the sleeve and are positioned one on each side of the port opening in the transverse direction of the engine. The rings may be split to form baffling joints 29, which will allow the rings to expand to form gas tight joints. End rings 30 are positioned at the end of the sleeve to prevent the exhaust gases from passing between the aperture 20 and the outer wall of the sleeve. The rotary valve, designated as a whole by the numeral 31, is rotatably mounted within the sleeve 22, and may be supported on the ball bearings 32 at each end of the cylinder head, the inner ball races of said bearings being adapted to frictionally engage with the reduced end portions 33 and 34 of the valve. The valve may be driven by suitable mechanism (not shown), which gears with the toothed gear wheel 35 secured to the end 33 of the valve. Valve port openings 36 and exhaust port openings 37 are formed in the valve and are adapted to register with the cylinder port openings 27 during the rotation of the valve. There are four sets of exhaust openings 38 formed in the valve, adapted to register with the exhaust chambers S. The exhaust openings 38 communicate with centrally disposed exhaust chambers, $38^b$ which are connected to the exhaust port openings 37 by means of the cored passageway or pocket 39. There are three sets of valve intake openings $39^a$ adapted to communicate with centrally disposed intake chambers 40, which are connected to the valve port opening 36 on each side of the chambers 40 by means of the passageways 41. The passageways 39 and 41 are divided by a wall 42 to prevent the exhaust gases from intermingling with the gas being fed into the explosion chambers (see Figure 18). Oil is fed to the valve through the oil feed pipes $42^a$, the oil holes 43 and 44 formed in the cylinder head and sealing rings respectively. The holes in the sealing rings are adapted to register with holes 45 formed in the sleeve which is provided with circumferentially cut grooves 48 on its inner surface. Small grooves 47 are cut in the outer wall of the valve to carry the oil from the groove 48 to a plurality of longitudinally disposed grooves 49 formed in the inner wall of the cylindrical portion of the sleeve to ensure perfect lubrication of the valve. Modifications may be made in the valve mechanism without departing from the spirit of the invention.

In operation, gas is drawn through the carburetter into the intake manifold by the suction stroke or downward movement of the pistons, and the rotary valve controls the feed of the mixture to the explosion chambers at the head of the cylinders. In the illustration disclosed, the order of firing or exploding the gases in the cylinders is as follows—A, D, B, F, C and E, and the position of the valve ports is shown in Figure 18. In cylinder A the valve is closed and the gases are compressed ready for firing. In cylinder B the gaseous mixture is being drawn into the cylinder through the downward movement of the piston. In cylinder C the burnt gases are being exhausted by the upward movement of the piston. In cylinder D the valve is closed and the gases are being compressed by the upward movement of the piston. In cylinder E the valve is closed and the piston is being driven downwardly by the exploding gases and, in cylinder F, the exhaust port is shown almost closed. The above illustration shows the condition of the engine valve at a certain period in its operation. The gases are drawn into the centrally disposed intake chambers 40 through the openings $39^a$, as shown in Figure 13, and to ensure that a sufficient quantity of gas enters each chamber at least four of the six inlet apertures are open, the remainder being closed by means of the rib joining the cylindrical portions of the sleeve. The gas in passing through the apertures is subjected to fanning action, which assists in atomizing the gas before it enters the cylinders. Each intake chamber is adapted to feed two cylinders positioned one on each side of it, and passages are cored in the valve leading from the intake chambers to the valve port openings. Sealing rings are provided to prevent the gases from passing along the outer wall of the sleeve and an oil seal is provided between the sleeve and the valve. The burnt gases are driven from the cylinders by the upward stroke of the pistons and are driven through the exhaust openings 37 into the exhaust chambers formed in the valve and positioned to one side of the cylinders. A plurality of outlet apertures are formed in the wall of the valve to allow the burnt gases to escape from the valve exhaust chambers into the exhaust manifold, as shown in Figure 12. By constructing the outlets in the manner disclosed, a rapid disposal of the burnt gases is ensured. The hot exhausting gases contained in the pockets or passageways assist in raising the temperature of the gas before being sucked into the cylinder, thereby assisting in increasing the efficiency of the engine.

It will be noticed that the number of valve moving parts is reduced to a minimum and the sleeve, being provided with ribs allows a certain amount of flexibility to the valve to prevent binding of same. The sleeve is mounted on split rings which allow the sleeve to expand but prevent leakage of the gases. A valve constructed in the manner disclosed having only one moving part, well lubricated and having means to allow free expansion of the valve, as well as means for atomizing and feeding the intake and also having means for efficiently discharging the exhaust gases, provides a highly efficient device for controlling internal combustion engines.

Having thus described my invention, what I claim is:—

1. An internal combustion engine valve comprising a cylindrical sleeve internally partitioned to provide a plurality of exhaust chambers separated from one another by intervening gas admission chambers, the cylindrical wall of each chamber being formed with a series of openings spaced therearound, the series of openings communicating with the exhaust chambers constituting the outlets from said chambers while the series of openings communicating with the gas admission chambers constitute gas inlets thereto, each gas admission chamber being provided with a pair of outlet openings located at opposite sides of the inlet openings to said chamber and in alignment circumferentially of the sleeve with a pair of inlet openings communicating with the exhaust chambers between which said gas admission chamber is located, a lining sleeve in which said valve is inserted, said lining sleeve comprising cylindrical portions surrounding the portions of the valve in which are formed the outlets from the gas admission chambers and the inlets to the exhaust chambers and being each provided with a port adapted to align with said inlets and outlets in the operation of the valve, spacing ribs connecting the aforesaid cylindrical portions of the lining sleeve, said cylindrical portions of the lining sleeve being provided with interior circumferentially extending lubricant grooves intersecting radial openings extending from the inner to the outer surface of the lining sleeve, each cylindrical portion of the lining sleeve being further provided interiorly thereof with a plurality of longitudinally disposed grooves to which oil is conveyed from the circumferentially extending groove via small grooves formed in the outer surface of the valve.

2. An internal combustion engine valve comprising a cylindrical sleeve internally partitioned to provide a plurality of exhaust chambers separated from one another by intervening gas admission chambers, the cylindrical wall of each chamber being formed with a series of openings spaced therearound, the series of openings communicating with the exhaust chambers constituting the outlets from said chambers while the series of openings communicating with the gas admission chambers constitute gas inlets thereto, each gas admission chamber being provided with a pair of outlet openings located at opposite sides of the inlet openings to said chamber and in alignment circumferentially of the sleeve with a pair of inlet openings communicating with the exhaust chambers between which said gas admission chamber is located, a lining sleeve in which said valve is inserted, said lining sleeve comprising cylindrical portions surrounding the portions of the valve in which are formed the outlets from the gas admission chambers and the inlets to the exhaust chambers and being each provided with a port adapted to align with said inlets and outlets in the operation of the valve, spacing ribs connecting the aforesaid cylindrical portions of the lining sleeve, said cylindrical portions of the lining sleeve being provided with interior circumferentially extending lubricant grooves intersecting radial openings extending from the inner to the outer surface of the lining sleeve, each cylindrical portion of the lining sleeve being further provided interiorly thereof with a plurality of longitudinally disposed grooves to which oil is conveyed from the circumferentially extending groove via small grooves formed in the outer surface of the valve and spaced sealing rings encircling the lining sleeve at points directly opposite the radial openings formed in said sleeve, said sealing rings being formed with apertures through which oil is delivered to said radial openings and means for conveying oil to the apertures of the sealing rings.

In witness whereof, I have hereunto set my hand.

ADOLF A. J. WESTMAN.